US012103665B2

(12) United States Patent
Szarek

(10) Patent No.: US 12,103,665 B2
(45) Date of Patent: Oct. 1, 2024

(54) REMOVABLE WINGLET FOR AN AIRCRAFT

(71) Applicant: THE BOEING COMPANY, Chicago, IL (US)

(72) Inventor: Kenneth Szarek, Beaufort, SC (US)

(73) Assignee: The Boeing Company, Chicago, IL (US)

(*) Notice: Subject to any disclaimer, the term of this patent is extended or adjusted under 35 U.S.C. 154(b) by 95 days.

(21) Appl. No.: 18/067,187

(22) Filed: Dec. 16, 2022

(65) Prior Publication Data
US 2024/0199200 A1 Jun. 20, 2024

(51) Int. Cl.
*B64C 23/06* (2006.01)
*B64D 7/08* (2006.01)

(52) U.S. Cl.
CPC ............. *B64C 23/069* (2017.05); *B64D 7/08* (2013.01); *B64C 2211/00* (2013.01)

(58) Field of Classification Search
CPC ..... B64C 23/069; B64C 2211/00; B64D 7/08; B64D 7/04; B64D 7/06; B64U 30/12; B64U 2101/18
See application file for complete search history.

(56) References Cited

U.S. PATENT DOCUMENTS

| 5,036,466 | A | * | 7/1991 | Fitzgerald | F41G 7/007 |
| | | | | | 714/E11.016 |
| 9,048,548 | B2 | | 6/2015 | Palmer | |
| 2007/0018049 | A1 | * | 1/2007 | Stuhr | B64C 23/069 |
| | | | | | 244/124 |
| 2015/0101478 | A1 | * | 4/2015 | Palmer | F41F 3/06 |
| | | | | | 89/1.819 |
| 2018/0327094 | A1 | * | 11/2018 | Ewing | B64D 7/00 |

FOREIGN PATENT DOCUMENTS

CN 103625634 A * 3/2014

* cited by examiner

*Primary Examiner* — Brady W Frazier
*Assistant Examiner* — Peter A Taraschi
(74) *Attorney, Agent, or Firm* — Joseph M. Butscher; The Small Patent Law Group LLC

(57) ABSTRACT

A winglet is configured to be removably coupled to a missile launcher that is secured to a wing of an aircraft. The winglet includes an airfoil, and one or more couplers configured to removably couple to a coupling interface of the missile launcher.

20 Claims, 8 Drawing Sheets

REMOVABLE WINGLET FOR AN AIRCRAFT

FIELD OF THE DISCLOSURE

Examples of the present disclosure generally relate to winglets for an aircraft, and more particularly to winglets that are configured to be removably coupled to the aircraft.

BACKGROUND OF THE DISCLOSURE

Various military aircraft include missile launchers that retain missiles. Examples of mission launchers include United States Department of Defense LAU-7 and LAU 127 missile launchers. During a combat mission, a pilot can operate the missile launchers to deploy the missiles from the missile launchers.

However, military aircraft frequently fly on non-combat missions. For example, a military aircraft may fly a ferry route, such as in a non-combat, relocation mission. During these missions, missiles may not be mounted on the missile launchers.

SUMMARY OF THE DISCLOSURE

A need exists for a system and a method for improving fuel efficiency and range for an aircraft during a non-combat mission. Further, a need exists for a simple, efficient, and effective system and method for adapting an aircraft to a non-combat mission.

With those needs in mind, certain examples of the present disclosure provide a winglet configured to be removably coupled to a missile launcher secured to a wing of an aircraft. The winglet includes an airfoil, and one or more couplers configured to removably couple to a coupling interface of the missile launcher.

In at least one example, the winglet is configured to be removed from the missile launcher, and a missile is configured to be removably coupled to the missile launcher after the winglet is removed from the missile launcher. In at least one further example, the missile is configured to be removed from the missile launcher, and the winglet is configured to be recoupled to the missile launcher after the missile is removed from the missile launcher.

In at least one example, the winglet does not directly secure to the wing of the aircraft.

In at least one example, the one or more couplers are configured the same as one or more couplers of a missile that is configured to removably secure to the coupling interface of the missile launcher.

In at least one example, the airfoil is out of plane in relation to a central longitudinal plane of the wing. A connecting beam can extend from a root of the airfoil, and the one or more couplers can extend inwardly from the connecting beam away from the root. The one or more couplers can include a forward hanger, a center hanger, and an aft hanger.

In at least one example, a weapons insertion panel code is associated with the winglet. A control unit is configured to receive the weapons insertion panel code to confirm that the winglet is secured to the missile launcher.

Certain examples of the present disclosure provide a method for removably coupling a winglet having an airfoil to a missile launcher secured to a wing of an aircraft. The method includes removably coupling one or more couplers of the winglet to a coupling interface of the missile launcher.

Certain examples of the present disclosure provide an aircraft including a fuselage, wings extending from the fuselage, missile launchers secured to the wings, and winglets configured to be removably coupled to the missile launchers, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for adapting an aircraft to a non-combat mission to improve fuel efficiency and range. The systems and methods adaptively utilize the missile launchers, which may be unused during a non-combat mission, to increase fuel efficiency and range of the aircraft. In particular, adaptable winglets are removably secured to the missile launchers. The winglets improve fuel efficiency and range of the aircraft, such as during non-combat missions. The winglets reduce vortex spoil off the end of the wings. It has been found that during long haul flights (such as non-combat ferry missions), the winglets substantially increase range and substantially reduce fuel consumption.

In at least one example, the missile launchers are mounted on wings of the aircraft. For example, each wing includes a distal tip, at which a missile launcher is mounted. Examples of the missile launchers include, but at are not limited to, LAU-7 and/or LAU-127 missile launchers. As described herein, the winglets are removably coupled to the missile launchers, instead of being directly secured to the wings themselves. In contrast, permanently securing winglets to the wings would permanently remove the missile launchers therefrom, and prevent the ability to launch missiles from such locations, which are typically important missile stations for military fighter aircraft.

In at least one example, a winglet includes mounting protrusions, such as hangers, that are the same as those of missiles that are configured to removably coupled to a missile launcher. For example, the mounting protrusions of the winglet allow it to be removably secured to a missile launcher in the same manner as a missile. It has been found that a winglet can be removably coupled to a missile launcher in a relatively short period of time (such as 15 minutes or less). Further, use of the winglets increase a range of the aircraft by more than 10%, and even as high as 30%. In at least one example, the winglet is configured to slide into any existing United States Department of Defense (DOD) wing tip mounted LAU-7 or LAU-127 missile launcher.

Figure 1:
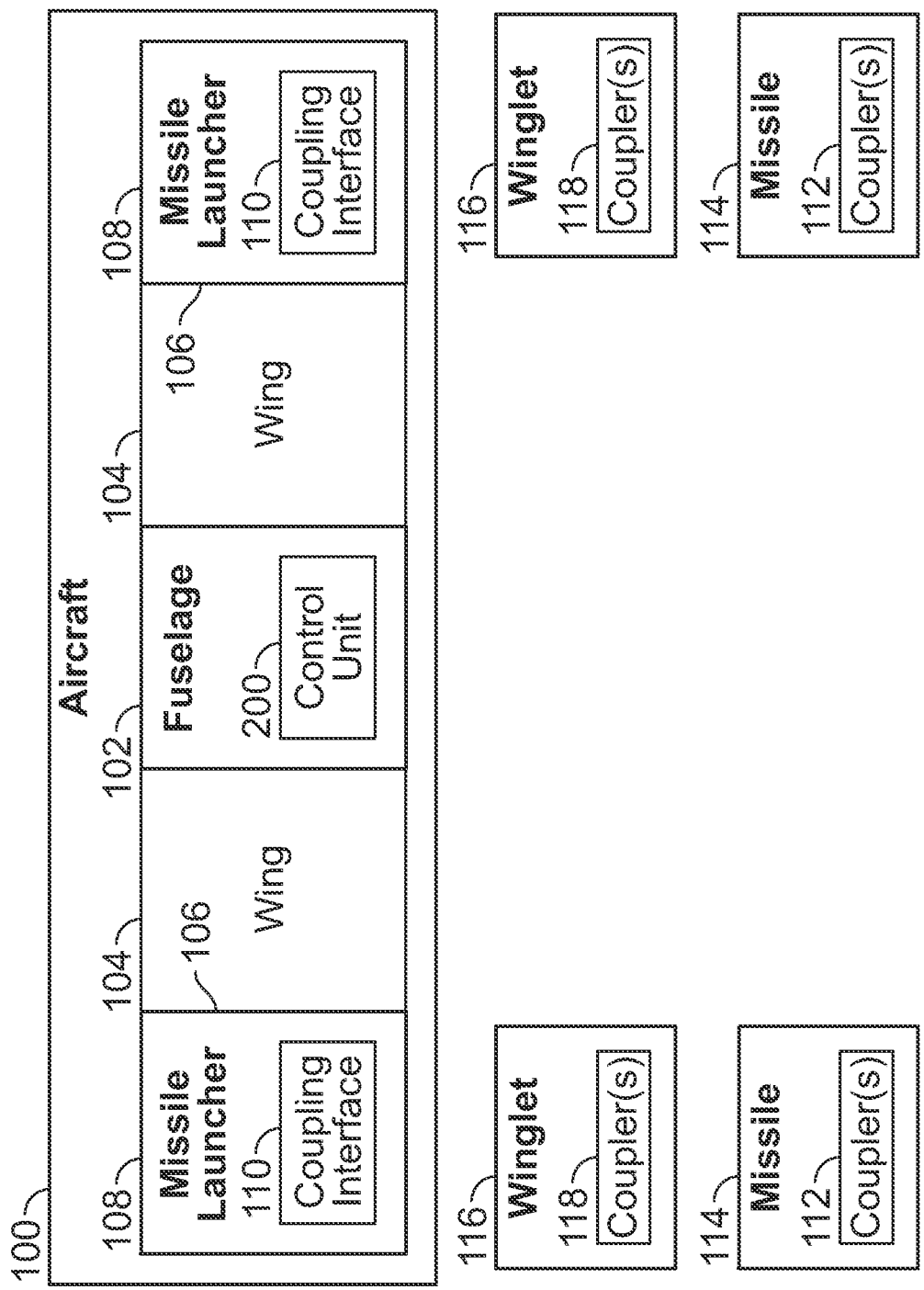
FIG. 1 illustrates a block diagram of an aircraft, according to an example of the present disclosure.

FIG. 1 illustrates a block diagram of an aircraft 100, according to an example of the present disclosure. In at least one example, the aircraft 100 is a military fight jet, such as a United States Navy F-18, or a United States Air Force F-16. As another example, the aircraft 100 can be an unmanned aerial vehicle (UAV). The aircraft 100 includes a fuselage 102, and wings 104 extending outwardly from the fuselage 102. Each wing 104 includes a distal edge or tip 106. A missile launcher 108 is mounted on the wing 104. For example, the missile launcher 108 is secured to the distal edge or tip 106 of the wing 104. As another example, the missile launcher 108 is secured underneath or above the distal edge or tip 106.

Examples of the missile launcher 108 include, but are not limited to, a LAU-7 or LAU-127 missile launcher. The missile launcher 108 includes a coupling interface 110 configured to receive and removably retain one or more couplers 112 of a missile 114. The couplers 112 can be or otherwise include protrusions, such as hangers, beams, studs, and/or the like. During a non-combat mission, the missiles 114 can be removed from the missile launchers 108. After the missiles 114 are removed from the missile launchers 108, winglets 116 are removably secured to the missile launchers 108. The winglets 116 are wing-like structures set at an angle to a plane of the wing 104. The winglets 116 are configured to reduce drag by affecting wingtip vortices. The winglets 116 reduce vortex spoil, and thereby increase fuel efficiency and range of the aircraft 100. Each winglet 116 includes one or more couplers 118 that are configured the same as the coupler(s) 112 of the missiles 114. In this manner, the coupler(s) 118 of the winglets 116 are received and removably retained by the coupling interfaces 110 of the missile launchers 108. Accordingly, examples of the present disclosure provide systems and methods for selectively adapting the aircraft 100 to combat and non-combat missions. The winglets 116 and missiles 114 are interchangeably coupled to the missile launchers 108. During a non-combat mission, the winglets 116 are mounted to the missile launchers 108 to improve fuel efficiency and range of the aircraft 100.

The missile launchers 108 remain secured to the wings 104. The missile launchers 108 themselves are not removed from the wings 104. Instead, the winglets 116 and the missiles 114 can be interchangeably coupled to the missile launchers 108. Therefore, the aircraft 100 retains the mounting locations for the missiles 114, such as at the wing tips 106, while also allowing for the winglets 116 to be removably secured thereto in order to improve fuel efficiency and range of the aircraft 100. The wings 104 themselves are not reworked or reconstructed in order to utilize the winglets 116, as the missile launchers 108 receive and retain the winglets 116 (as opposed to the winglets 116 being directly secured to the wings 104).

Figure 2:
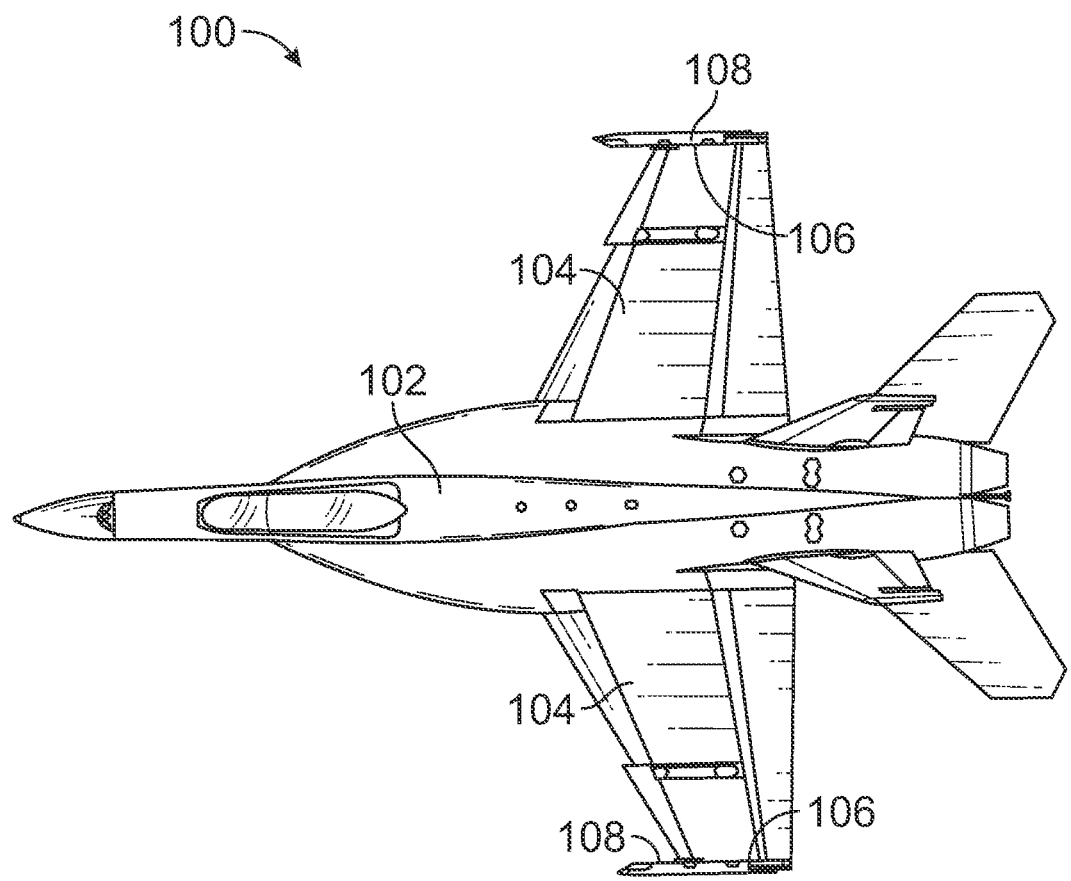
FIG. 2 illustrates a top plan view of an aircraft, according to an example of the present disclosure.

FIG. 2 illustrates a top plan view of an aircraft 100, according to an example of the present disclosure. The aircraft 100 includes the missile launchers 108 secured to the distal edges or tips 106 of the wings 104. As shown in FIG. 2, there are no missiles or winglets secured to the missile launchers 108.

Referring to FIGS. 1 and 2, the missiles 114 can be air-to-air or air-to-ground missiles. The missile launchers 108 can be ejection type missile launchers, such as the LAU-142, or rail missile launchers, such as the LAU-7 or LAU-127.

Figure 3:
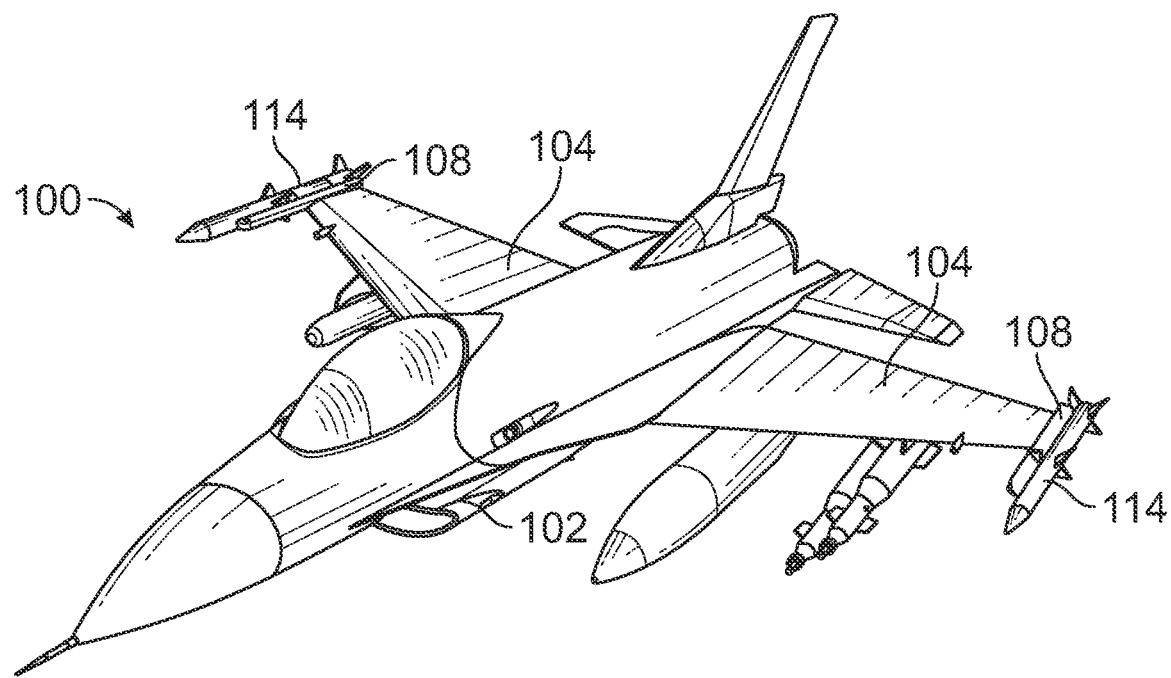
FIG. 3 illustrates a front top perspective view of an aircraft, according to an example of the present disclosure.

FIG. 3 illustrates a front top perspective view of an aircraft 100, according to an example of the present disclosure. As shown in FIG. 3, missiles 114 are removably secured to the missile launchers 108. The missiles 114 can be removed from the missile launchers 108, in order to removably secure winglets 116 (shown in FIG. 1) to the missile launchers 108.

Figure 4:
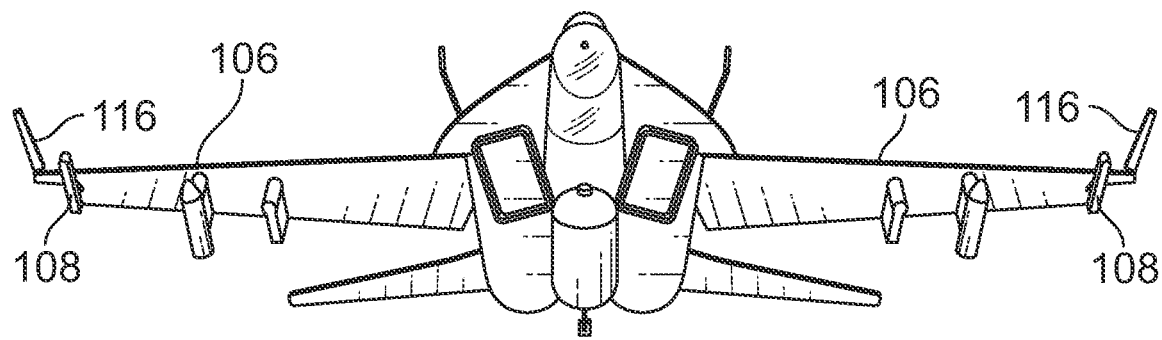
FIG. 4 illustrates a front bottom perspective view of an aircraft, according to an example of the present disclosure.

FIG. 4 illustrates a front bottom perspective view of an aircraft 100, according to an example of the present disclosure. As shown in FIG. 4, winglets 116 are removably secured to the missile launchers 108. The winglets 116 can be removed from the missile launchers 108, in order to removably secure missiles 114 (shown in FIGS. 1 and 3) to the missile launchers 108.

Figure 5:
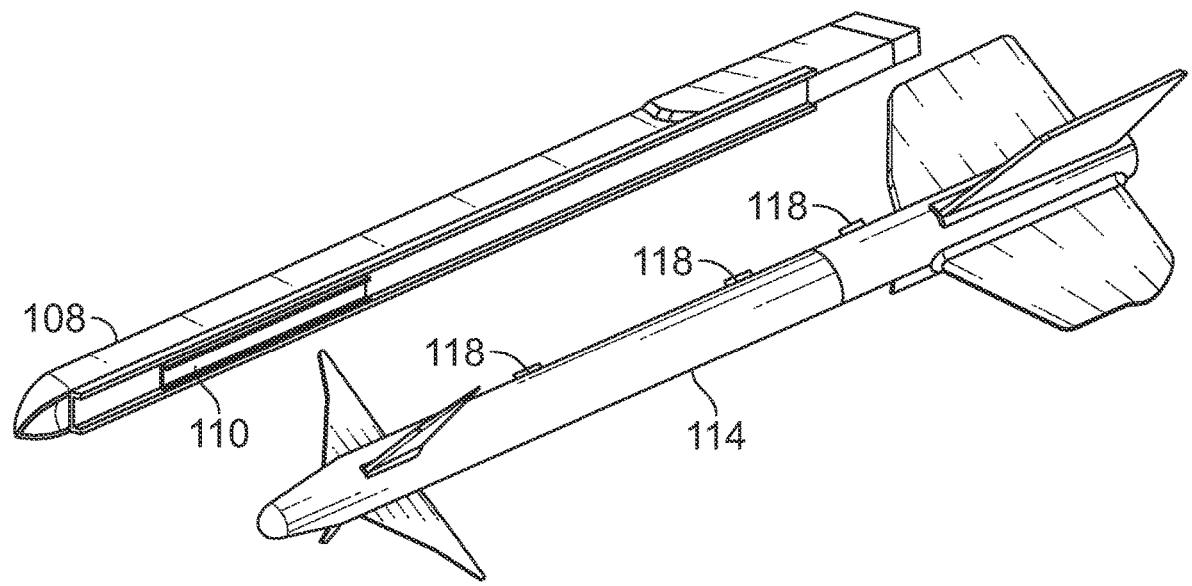
FIG. 5 illustrates a perspective view of a missile separated from a missile launcher, according to an example of the present disclosure.

FIG. 5 illustrates a perspective view of a missile 114 separated from a missile launcher 108, according to an example of the present disclosure. The missile 114 includes one or more couplers 112 configured to be received and removably retained by the coupling interface 110 of the missile launcher 108.

Figure 6:
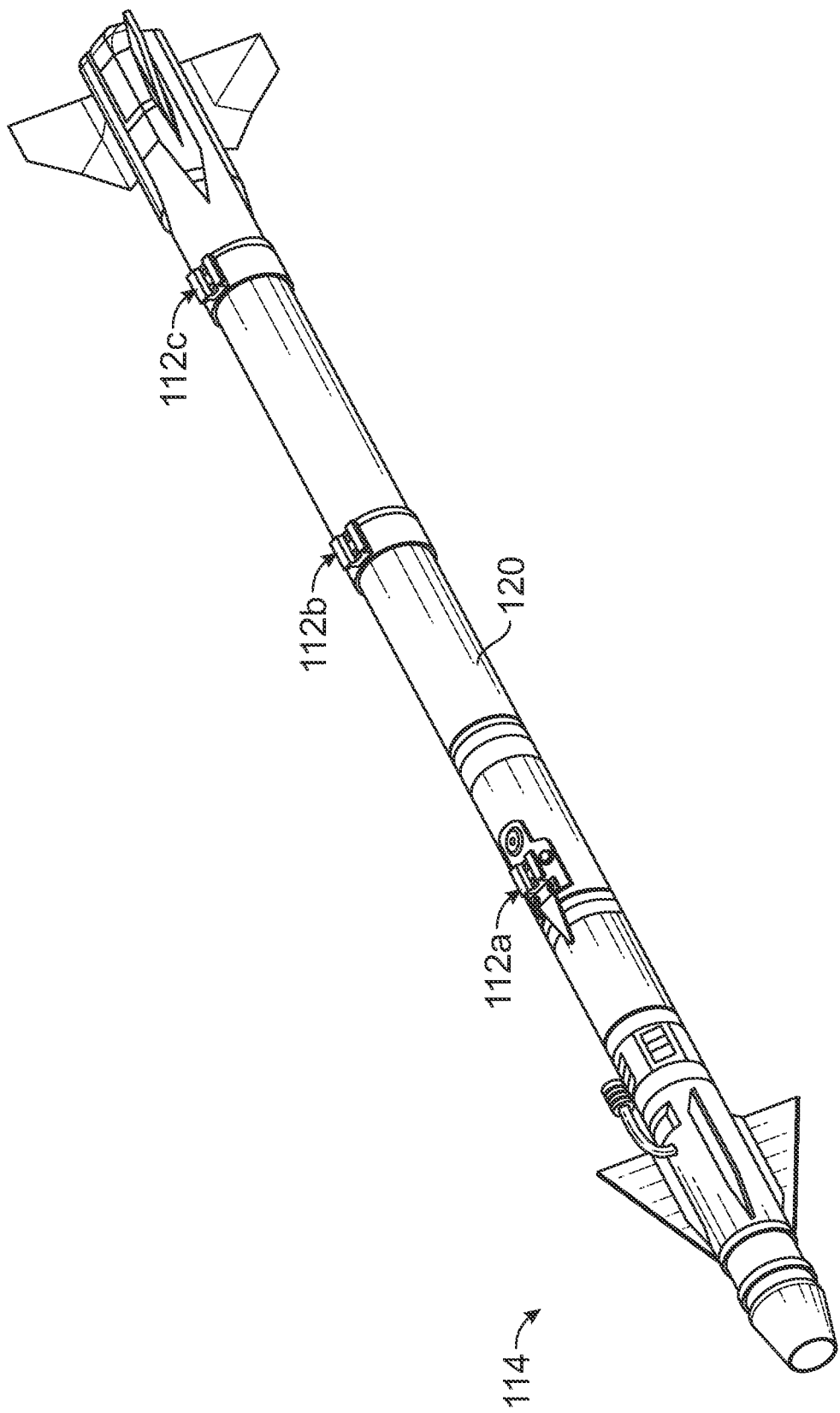
FIG. 6 illustrates a perspective view of a missile, according to an example of the present disclosure.

FIG. 6 illustrates a perspective view of a missile 114, according to an example of the present disclosure. The missile 114 includes a main body 120 and a plurality of couplers 112a, 112b, and 112c extending from the main body 120. The couplers 112a, 112b, and 112c are protrusions configured to be received and retained by a coupling interface 110 of a missile launcher 108 (shown in FIG. 1, for example). For example, the coupler 112a can be a forward hanger, the coupler 112b can be a center hanger, and the coupler 112c can be an aft hanger. Referring to FIGS. 1 and 6, in at least one example, the winglets 116 include couplers 118 that are sized, shaped, spaced, and configured the same as the couplers 112a, 112b, and 112c so that the winglets 116 can be received and removably retained by the coupling interfaces 110 of the missile launchers 108.

Figure 7:
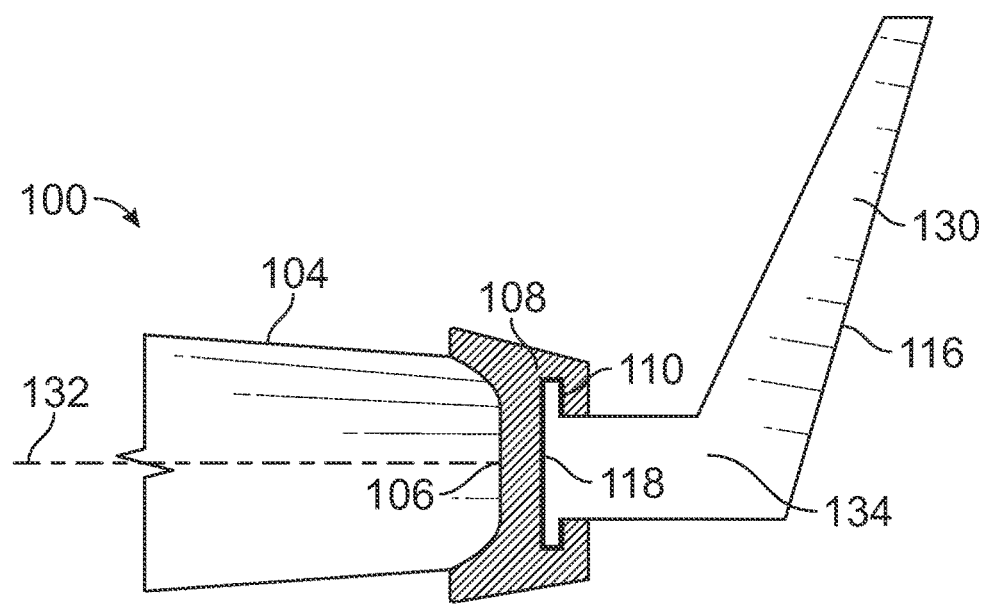
FIG. 7 illustrates a simplified front view of a winglet secured to a missile launcher of an aircraft, according to an example of the present disclosure.

FIG. 7 illustrates a simplified front view of a winglet 116 secured to a missile launcher 108 of an aircraft 100, according to an example of the present disclosure. As shown, the missile launcher 108 is mounted to a distal edge or tip 106 of the wing 104. The winglet 116 includes an upturned airfoil 130 that is out of plane in relation to a central longitudinal plane 132 of the wing 104. The airfoil 130 can extend from a connecting beam 134, which includes the one or more couplers 118 that are received and removably retained by the coupling interface 110 of the missile launcher 108. In at least one example, the couplers 118 can be sized, shaped, spaced and configured the same as the couplers 112a, 112, and 112c shown in FIG. 6.

Figure 8:
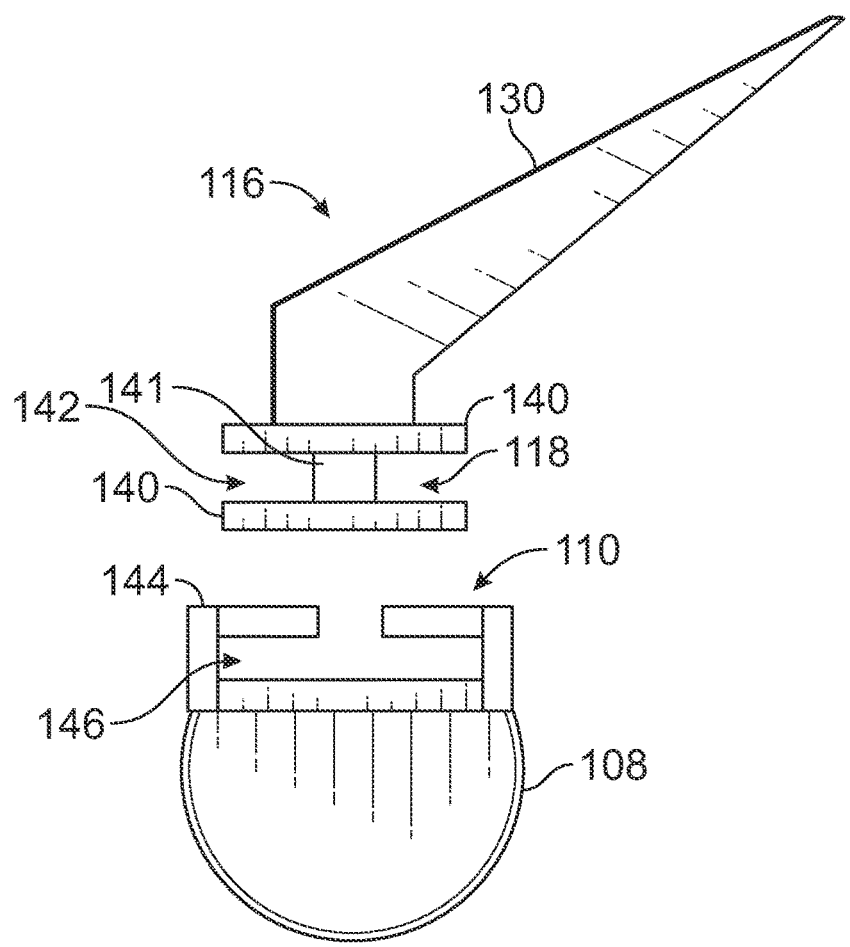
FIG. 8 illustrates a simplified schematic view of a winglet separated from a missile launcher, according to an example of the present disclosure.

FIG. 8 illustrates a simplified schematic view of a winglet 116 separated from a missile launcher 108, according to an example of the present disclosure. The winglet 116 can include one or more couplers 118 including hangers having one or more flanges 140 connected by a central stud 141, and separated by a gap 142. The coupling interface 110 includes reciprocal retaining walls 144 that define a retaining chamber 146. The coupler(s) 118 are configured to slide into the retaining chamber 146, and be held in place by snubbers, detents, and/or the like of the missile launcher 108.

Figure 9:
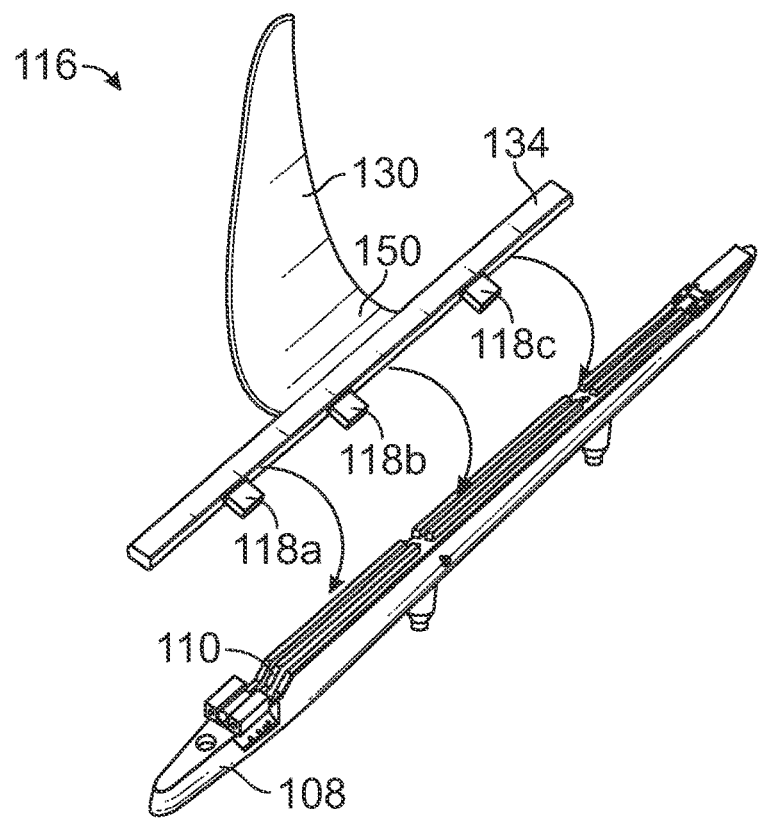
FIG. 9 illustrates a perspective top view of a winglet separated from a missile launcher, according to an example of the present disclosure.

FIG. 9 illustrates a perspective top view of a winglet 116 separated from a missile launcher 108, according to an example of the present disclosure. The missile launcher 108 can be a LAU-7 missile launcher. The winglet 116 includes the upturned airfoil 130. A connecting beam 134 extends from a root 150 of the airfoil 130. The connecting beam 134 can be a linear beam. Couplers 118a, 118b, and 118c extend inwardly from the connecting beam 134 away from the root 150. The couplers 118a, 118b, and 118c can be sized, shaped, spaced, and configured the same as the couplers 112a, 112b, and 112c of the missile 114 shown in FIG. 6. For example, the coupler 118a can be a forward hanger, the coupler 118b can be a center hanger, and the coupler 118c can be an aft hanger. The couplers 118a, 118b, and 118c are configured to be received and removably retained by the coupling interface 110 of the missile launcher 108.

Figure 10:
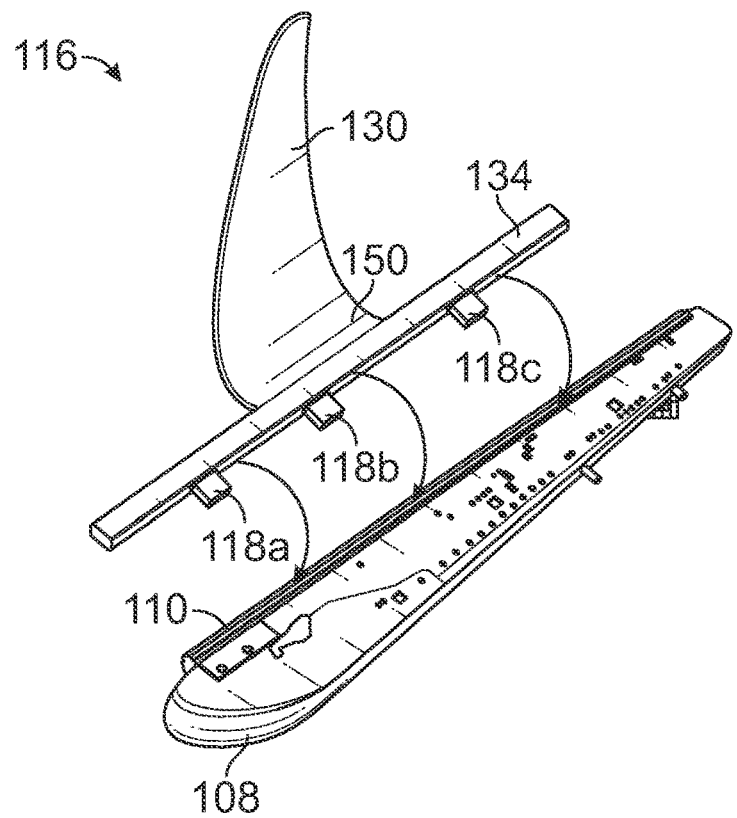
FIG. 10 illustrates a perspective top view of a winglet separated from a missile launcher, according to an example of the present disclosure.

FIG. 10 illustrates a perspective top view of a winglet 116 separated from a missile launcher 108, according to an example of the present disclosure. The winglet 116 is the same or similar to that shown and described in FIG. 9. The missile launcher 108 shown in FIG. 10 can be a LAU-127 missile launcher. Referring to FIGS. 6-10, the winglet 116 remains secured to the missile launcher 108 in the same as manner as the missile 114. For example, the missile launcher 108 can include a detent, detent lock, detent-lock k solenoid, and forward snubbers, which form an electromechanical system that restricts longitudinal and lateral motion of the missile 114 and the winglet 116. The electromechanical system prevents accidental release. A slotted detent wrench/safety pin can be provided that prevents movement of an aft detent, and to raise an aft detent lug sufficiently to clear the couplers 112a, 112b, 112c, 118a, 118b, and 118c during loading. The slotted detent wrench/safety pin is removed before flight. When the detent is down (normal), striker points contact the buttons (contacts) on the forward hangers.

Referring again to FIG. 1, the aircraft 100 includes a control unit 200, which can be part of a flight computer within the fuselage 102 (such as within a cockpit of the aircraft 100). In at least one example, the control unit 200 is a stores management processor that is configured to use a weapons insertion panel code for a winglet 116 to confirm that the winglet 116 is secured to the missile launcher 108. The weapons insertion panel code is unique to the winglet 116. In at least one example, there may be no electrical interface from the winglet 116 to the control unit 200. That is, the winglet 116 need not be in electrical communication with the control unit 200 (or even the missile launcher 108).

A weapons insertion panel code is associated with the winglet 116. The control unit 200 is configured to receive the weapons insertion panel code associated with the winglet 116 to confirm that the winglet 116 is secured to the missile launcher 108.

In operation, the winglet 116 is secured to the missile launcher 108. The weapons insert panel code is then entered into the control unit 200, which then confirms that the winglet 116 is secured to the missile launcher 108 (such as by communicating such information to an advanced mission computer of the aircraft 100). In this manner, the winglet 116 need not electrically communicate with the control unit 200. The weapons insertion panel code is entered, such as by an individual, so that the control unit 200 can adjust (or communicate within advanced mission computer to adjust) a weight, balance, and the like of the aircraft 100 to account for the winglets 116.

In at least one other example, the winglet 116 may include an identification device, such as a radio frequency identification (RFID) tag that includes the weapons insertion panel code associated with the winglet 116. A reader, such as an RFID reader, may receive the weapons insertion panel code when the winglet 116 is secured to the missile launcher 108. The reader can be in communication with the control unit 200, which may automatically receive the weapons insertion panel code from the reader, instead of the code being manually input into the control unit 200.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, a quantum computer, and any other circuit or processor including hardware, software, or a combination thereof capable of executing the functions described herein. Such are exemplary only, and are thus not intended to limit in any way the definition and/or meaning of such terms. For example, the control unit 200 may be or include one or more processors that are configured to control operation, as described herein.

The control unit 200 is configured to execute a set of instructions that are stored in one or more data storage units or elements (such as one or more memories), in order to process data. For example, the control unit 200 may include or be coupled to one or more memories. The data storage units may also store data or other information as desired or needed. The data storage units may be in the form of an information source or a physical memory element within a processing machine.

The set of instructions may include various commands that instruct the control unit 200 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 200. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 200 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-10, a winglet 116 is configured to be removably coupled to a missile launcher 108 of an aircraft 100. The winglet 116 includes an airfoil 130, and one or more couplers 118 configured to be removably coupled to a coupling interface 110 of the missile launcher 108. The winglet 116 is configured to be removed from the missile launcher 108, and a missile 114 is configured to be removably coupled to the missile launcher 108 after the winglet 116 is removed from the missile launcher 108. Similarly, the missile 114 is configured to be removed from the missile launcher 108, and the winglet 116 is configured to be recoupled to the missile launcher 108 after the missile 114 is removed from the missile launcher 108.

Figure 11:
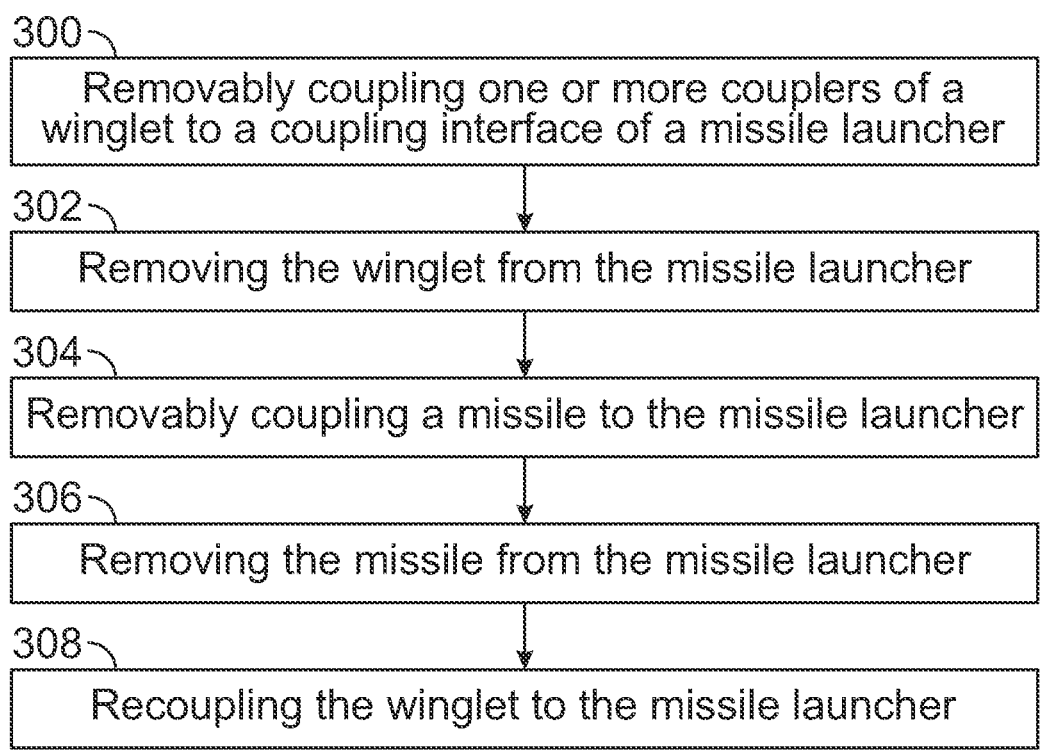
FIG. 11 illustrates a flow chart of a method for removably coupling a winglet having an airfoil to a missile launcher secured to a wing of an aircraft, according to an example of the present disclosure.

FIG. 11 illustrates a flow chart of a method for removably coupling a winglet having an airfoil to a missile launcher secured to a wing of an aircraft, according to an example of the present disclosure. Referring to FIGS. 1 and 11, the method includes removably coupling, at 300, one or more couplers 118 of the winglet 116 to a coupling interface 110 of the missile launcher 108. The method can also include removing, at 302, the winglet 116 from the missile launcher 108. The method can also include removably coupling, at 304, a missile 114 to the missile launcher 108 after the winglet 116 is removed from the missile launcher 108. The method can also include removing, at 306, the missile 114 from the missile launcher 108. The method can also include recoupling, at 308, the winglet 116 to the missile launcher 108 after the missile 114 is removed from the missile launcher 108. In at least one example, the method also includes associating a weapons insertion panel code with the winglet 116, and receiving, by a control unit 200, the weapons insertion panel code to confirm that the winglet 116 is secured to the missile launcher 108.

Further, the disclosure comprises examples according to the following clauses:

Clause 1. A winglet configured to be removably coupled to a missile launcher secured to a wing of an aircraft, the winglet comprising:
an airfoil; and
one or more couplers configured to removably couple to a coupling interface of the missile launcher.

Clause 2. The winglet of Clause 1, wherein the winglet is configured to be removed from the missile launcher, and wherein a missile is configured to be removably coupled to the missile launcher after the winglet is removed from the missile launcher.

Clause 3. The winglet of Clause 2, wherein the missile is configured to be removed from the missile launcher, and wherein the winglet is configured to be recoupled to the missile launcher after the missile is removed from the missile launcher.

Clause 4. The winglet of any of Clauses 1-3, wherein the winglet does not directly secure to the wing of the aircraft.

Clause 5. The winglet of any of Clauses 1-4, wherein the one or more couplers are configured the same as one or more couplers of a missile that is configured to removably secure to the coupling interface of the missile launcher.

Clause 6. The winglet of any of Clauses 1-5, wherein the airfoil is out of plane in relation to a central longitudinal plane of the wing.

Clause 7. The winglet of any of Clauses 1-6, further comprising a connecting beam extending from a root of the airfoil, wherein the one or more couplers extend inwardly from the connecting beam away from the root.

Clause 8. The winglet of any of Clauses 1-7, wherein the one or more couplers comprise a forward hanger, a center hanger, and an aft hanger.

Clause 9. The winglet of any of Clauses 1-8, wherein a weapons insertion panel code is associated with the winglet, and wherein a control unit is configured to receive the weapons insertion panel code to confirm that the winglet is secured to the missile launcher.

Clause 10. A method for removably coupling a winglet having an airfoil to a missile launcher secured to a wing of an aircraft, the method comprising:
removably coupling one or more couplers of the winglet to a coupling interface of the missile launcher.

Clause 11. The method of Clause 10, further comprising:
removing the winglet from the missile launcher; and
removably coupling a missile to the missile launcher after the winglet is removed from the missile launcher.

Clause 12. The method of Clause 11, further comprising:
removing the missile from the missile launcher; and
recoupling the winglet to the missile launcher after the missile is removed from the missile launcher.

Clause 13. The method of any of Clauses 10-12, wherein the winglet does not directly secure to the wing of the aircraft.

Clause 14. The method of any of Clauses 10-13, wherein the one or more couplers are configured the same as one or more couplers of a missile that is configured to removably secure to the coupling interface of the missile launcher.

Clause 15. The method of any of Clauses 10-14, wherein the airfoil is out of plane in relation to a central longitudinal plane of the wing.

Clause 16. The method of any of Clauses 10-15, further comprising a connecting beam extending from a root of the airfoil, wherein the one or more couplers extend inwardly from the connecting beam away from the root.

Clause 17. The method of any of Clauses 10-16, wherein the one or more couplers comprise a forward hanger, a center hanger, and an aft hanger.

Clause 18. The method of any of Clauses 10-17, further comprising:
associating a weapons insertion panel code with the winglet; and
receiving, by a control unit, the weapons insertion panel code to confirm that the winglet is secured to the missile launcher.

Clause 19. An aircraft comprising:
a fuselage;
wings extending from the fuselage;
missile launchers secured to the wings; and winglets configured to be removably coupled to the missile launchers, the winglets comprising:

an airfoil; and one or more couplers configured to removably couple to coupling interfaces of the missile launchers, wherein the winglets are configured to be removed from the missile launchers, wherein missiles are configured to be removably coupled to the missile launchers after the winglets are removed from the missile launchers, wherein the missiles are configured to be removed from the missile launchers, and wherein the winglets are configured to be recoupled to the missile launchers after the missiles are removed from the missile launchers.

Clause 20. The aircraft of Clause 19, wherein a weapons insertion panel code is associated with the winglets, and wherein a control unit is configured to receive the weapons insertion panel code to confirm that the winglets are secured to the missile launchers.

As described herein, examples of the present disclosure provide systems and methods for improving fuel efficiency and range for an aircraft during a non-combat mission. Further, examples of the present disclosure provide simple, efficient, and effective systems and methods for adapting an aircraft to a non-combat mission.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for removably coupling a winglet having an airfoil to a missile launcher secured to a wing of an aircraft, the method comprising:

removably coupling one or more couplers of the winglet to a coupling interface of the missile launcher.

2. The method of claim 1, further comprising:

removing the winglet from the missile launcher; and removably coupling a missile to the missile launcher after the winglet is removed from the missile launcher.

3. The method of claim 2, further comprising:

removing the missile from the missile launcher; and recoupling the winglet to the missile launcher after the missile is removed from the missile launcher.

4. The method of claim 1, wherein the winglet does not directly secure to the wing of the aircraft.

5. The method of claim 1, wherein the one or more couplers are configured the same as one or more couplers of a missile that is configured to removably secure to the coupling interface of the missile launcher.

6. The method of claim 1, wherein the airfoil is out of plane in relation to a central longitudinal plane of the wing.

7. The method of claim 1, further comprising a connecting beam extending from a root of the airfoil, wherein the one or more couplers extend inwardly from the connecting beam away from the root.

8. The method of claim 1, wherein the one or more couplers comprise a forward hanger, a center hanger, and an aft hanger.

9. The method of claim 1, further comprising:

associating a weapons insertion panel code with the winglet; and receiving, by a control unit, the weapons insertion panel code to confirm that the winglet is secured to the missile launcher.

10. An aircraft comprising:

a fuselage;

wings extending from the fuselage;

missile launchers secured to the wings;

missiles configured to be removably coupled to the missile launchers; and winglets configured to be removably coupled to the missile launchers, the winglets comprising:

an airfoil; and one or more couplers configured to removably couple to coupling interfaces of the missile launchers, wherein the winglets are configured to be removed from the missile launchers, wherein the missiles are configured to be removably coupled to the missile launchers after the winglets are removed from the missile launchers, wherein the missiles are configured to be removed from the missile launchers, and wherein the winglets are configured to be recoupled to the missile launchers after the missiles are removed from the missile launchers.

11. The aircraft of claim 10, wherein a weapons insertion panel code is associated with the winglets, and wherein a control unit is configured to receive the weapons insertion panel code to confirm that the winglets are secured to the missile launchers.

12. A system comprising:
a missile launcher configured to be secured to a wing of an aircraft;
a missile configured to be removed from the missile launcher; and
a winglet configured to be coupled to the missile launcher after the missile is removed from the missile launcher.

13. The system of claim 12, wherein the winglet is configured to be removed from the missile launcher, and wherein the missile is configured to be coupled to the missile launcher after the winglet is removed from the missile launcher.

14. The system of claim 12, wherein the winglet does not directly secure to the wing of the aircraft.

15. The winglet of claim 12, wherein a weapons insertion panel code is associated with the winglet, and wherein a control unit is configured to receive the weapons insertion panel code to confirm that the winglet is secured to the missile launcher.

16. The system of claim 12, wherein the winglet comprises:
an airfoil; and
one or more couplers configured to removably couple to a coupling interface of the missile launcher.

17. The system of claim 16, wherein the one or more couplers are configured the same as one or more couplers of a missile that is configured to removably secure to the coupling interface of the missile launcher.

18. The system of claim 16, wherein the airfoil is out of plane in relation to a central longitudinal plane of the wing.

19. The system of claim 16, further comprising a connecting beam extending from a root of the airfoil, wherein the one or more couplers extend inwardly from the connecting beam away from the root.

20. The system of claim 16, wherein the one or more couplers comprise a forward hanger, a center hanger, and an aft hanger.

* * * * *